(12) United States Patent
Stoikos et al.

(10) Patent No.: US 9,566,704 B1
(45) Date of Patent: Feb. 14, 2017

(54) TOOLBOX

(71) Applicants: Christopher Stoikos, Valley Center, CA (US); Shaun T. Kjellman, Kirkland, WA (US)

(72) Inventors: Christopher Stoikos, Valley Center, CA (US); Shaun T. Kjellman, Kirkland, WA (US)

(*) Notice: Subject to any disclaimer, the term of this patent is extended or adjusted under 35 U.S.C. 154(b) by 0 days.

(21) Appl. No.: 14/801,431

(22) Filed: Jul. 16, 2015

Related U.S. Application Data (60) Provisional application No. 62/125,430, filed on Jan. 21, 2015.

(51) Int. Cl.

| A45C 11/26 | (2006.01) |
|---|---|
| B25H 3/02 | (2006.01) |
| B25H 3/06 | (2006.01) |
| A45C 11/00 | (2006.01) |
| A45C 13/00 | (2006.01) |
| A45C 13/02 | (2006.01) |
| A45C 13/10 | (2006.01) |
| A45C 13/26 | (2006.01) |
| B62B 1/10 | (2006.01) |
| H02J 7/00 | (2006.01) |
| F21V 33/00 | (2006.01) |
| G06F 3/16 | (2006.01) |
| H04R 1/02 | (2006.01) |
| F21Y 101/02 | (2006.01) |

(52) U.S. Cl.
CPC .............. *B25H 3/02* (2013.01); *A45C 11/00* (2013.01); *A45C 13/005* (2013.01); *A45C 13/02* (2013.01); *A45C 13/1069* (2013.01); *A45C 13/262* (2013.01); *B25H 3/06* (2013.01); *B62B 1/10* (2013.01); *F21V 33/0084* (2013.01); *G06F 3/162* (2013.01); *H02J 7/0045* (2013.01); *H02J 7/0052* (2013.01); *H04R 1/028* (2013.01); *A45C 2011/002* (2013.01); *A45C 2013/026* (2013.01); *F21Y 2101/02* (2013.01); *H02J 2007/0062* (2013.01)

(58) Field of Classification Search
CPC ........... B25H 3/02; B25H 3/06; A45C 13/005; A45C 13/1069; A45C 13/262
USPC ........................ 206/38, 216, 223, 234, 349, 372–379,206/723; 312/244, 902; 361/625; 362/154; 455/344, 351
See application file for complete search history.

(56) References Cited

U.S. PATENT DOCUMENTS 5,680,932 A * 10/1997 Dickinson ................ B25H 3/02
206/338
5,810,168 A * 9/1998 Eggering ................ A45C 15/00
206/372

(Continued)

*Primary Examiner* — Luan K Bui
(74) *Attorney, Agent, or Firm* — Quickpatents, LLC; Kevin Prince (57) ABSTRACT

A toolbox comprises a rigid case having an open top side providing access to an internal case storage volume therein, and a rigid cover with an open bottom side open to a cover storage volume. The cover is fixed with the case at a plurality of hinges. A removable message board and marking implement are selectively fixed within the cover storage volume of the cover. The rear side of the case includes winding posts around which a power cord is wound that conducts power to a power strip circuit having a plurality of power receptacles fixed with the case. An audio system is fixed with the case and includes a plurality of speakers, a display interface, a wireless audio signal receiver, and a control circuit. An optional bottle opener and removable lamp device may be further included.

20 Claims, 5 Drawing Sheets

(56) References Cited

U.S. PATENT DOCUMENTS

| | | | |
|---|---|---|---|
| 6,254,251 B1 * | 7/2001 | Washington | B25H 3/02 |
| | | | 362/154 |
| 6,294,759 B1 * | 9/2001 | Dunn, Jr. | B23K 3/00 |
| | | | 206/373 |
| 7,497,328 B2 * | 3/2009 | Tonelli | A45C 13/02 |
| | | | 206/305 |
| 2003/0139169 A1 * | 7/2003 | Arreazola, Jr. | H04B 1/086 |
| | | | 455/344 |
| 2004/0134818 A1 * | 7/2004 | Cunningham | B25H 3/023 |
| | | | 206/373 |
| 2008/0035507 A1 * | 2/2008 | Collister | B25H 3/006 |
| | | | 206/349 |
| 2008/0067091 A1 * | 3/2008 | Chang | A45C 5/00 |
| | | | 206/349 |
| 2010/0000893 A1 * | 1/2010 | Twig | B25H 3/023 |
| | | | 206/373 |

* cited by examiner

TOOLBOX

CROSS-REFERENCE TO RELATED APPLICATIONS

This application claims the benefit of U.S. Provisional Patent Application 62/125,430, filed on Jan. 21, 2015, and incorporated herein by reference.

STATEMENT REGARDING FEDERALLY SPONSORED RESEARCH AND DEVELOPMENT

Not Applicable.

FIELD OF THE INVENTION

This invention relates to toolboxes, and more particularly to multiple-use toolbox.

DISCUSSION OF RELATED ART

Toolboxes for holding and transporting tools have remained virtually unchanged for decades, such items comprising essentially a lockable case with a removable tray. As a result, contractors often have to carry not only their toolbox to a jobsite, but often other items such as radios or music players, extension cords, power strips, auxiliary lights, white boards, and the like.

Therefore, there is a need for a device that combines a conventional toolbox with a power strip and extension cord and an audio system for playing music or other audio programs. Such a needed device would further provide means a removable white board and a removable lamp that illuminates the contents of the toolbox or a surrounding location. Such a needed device would be easily transported by rolling to the jobsite, and would provide a bottle opener and external storage for cellular phones, wallets, keys and other valuables. The present invention accomplishes these objectives.

SUMMARY OF THE INVENTION

The present device is a toolbox that comprises a rigid case having an open top side that provides access to an internal case storage volume therein, and a rigid cover with an open bottom side open to a cover storage volume. A rear side of the cover is fixed proximate the bottom side with a rear side of the case proximate the open top side of the case at a plurality of hinges. The cover is movable between an open position that provides access to the case storage volume and the cover storage volume, and a closed position for closing the toolbox. An internal tray is included that rests on a ledge of the case. At least one two-part clasp mechanism is fixed with the front sides, of the case and cover to selectively secure the cover in the closed position.

At least one of the sides of the case may include a handle and the other side of the case and/or the bottom side may include two wheels. As such, the toolbox may be rolled along a ground surface by a user holding the handle and tilting the toolbox so that the toolbox is supported on the ground surface by the wheels.

A message board retaining mechanism, such as a pair of spring clips, is preferably fixed within the cover storage volume of the cover and adapted to selectively retain a removable message board therein, such as a white board. The cover storage volume further includes at least one marking implement holder for selectively retaining a marking implement for use on the message board.

A power cord receptacle is fixed the case and adapted to receive therein a connector of a power cord, which is either supplied with the toolbox or purchased separately. The rear side of the case preferably includes at least two winding posts around which the power cord is wound and secured for facilitating transport and storage of the toolbox. The power cord receptacle conducts power to a power strip circuit having a plurality of power receptacles. An electrical receptacle cover that is urged by a biasing means, such as a spring, covers the plurality of electrical receptacles.

An audio system is fixed with the case and includes a plurality of speakers, a display interface, and a control circuit that receives power from the power strip circuit. The control circuit includes a wireless audio signal receiver and, optionally, a clock circuit for displaying the current time on the display interface. The audio system further preferably includes at least one battery electrically connected through an optional on/off switch with the control circuit, and a transforming means such as a step-down transformer for providing a low-voltage power source to recharge the at least one battery of the audio system. The audio system may further include a standard headset or headphone jack for outputting an audio signal instead of through the plurality of speakers, and at least one USB slot electrically connected with the control circuit for supplying power to the at least one USB slot. The control circuit may be further adapted to receive the audio signal through the at least one USB slot from the portable electronic device as opposed to via the wireless audio signal receiver. An optional bottle opener may be fixed with either the case or the audio system.

A lamp device may be further included that is selectively removable from a lamp holder of the case. The lamp device includes a battery and at least one lamp or LED. The lamp holder holds the lamp device such that the lamp device is able to illuminate the case and cover storage volumes when the cover is in the open position. Preferably the lamp holder includes power contacts electrically connected to the battery of the lamp device is retained within the lamp holder. The power contacts of the lamp holder are electrically connected with either the power strip circuit or the battery of the audio system. As such the lamp holder acts as a recharging docking station for the lamp device, which may be removed to illuminate a workspace or the like if desired.

An external storage volume fixed within the audio system is covered with a spring-biased external storage volume cover. The external storage volume may be used to store keys, wallets, cellular phones, or the like, and may further include a battery compartment covered with a removable battery compartment door for the battery of the audio system.

The present invention is a device that combines a conventional toolbox with a power strip and extension cord and an audio system for playing music or other audio programs. The present device provides a removable white board and a removable lamp that illuminates the contents of the toolbox or a surrounding location. The toolbox of the present invention is easily transported by rolling to the jobsite, and provides a bottle opener and external storage for cellular phones, wallets, keys and other valuables. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
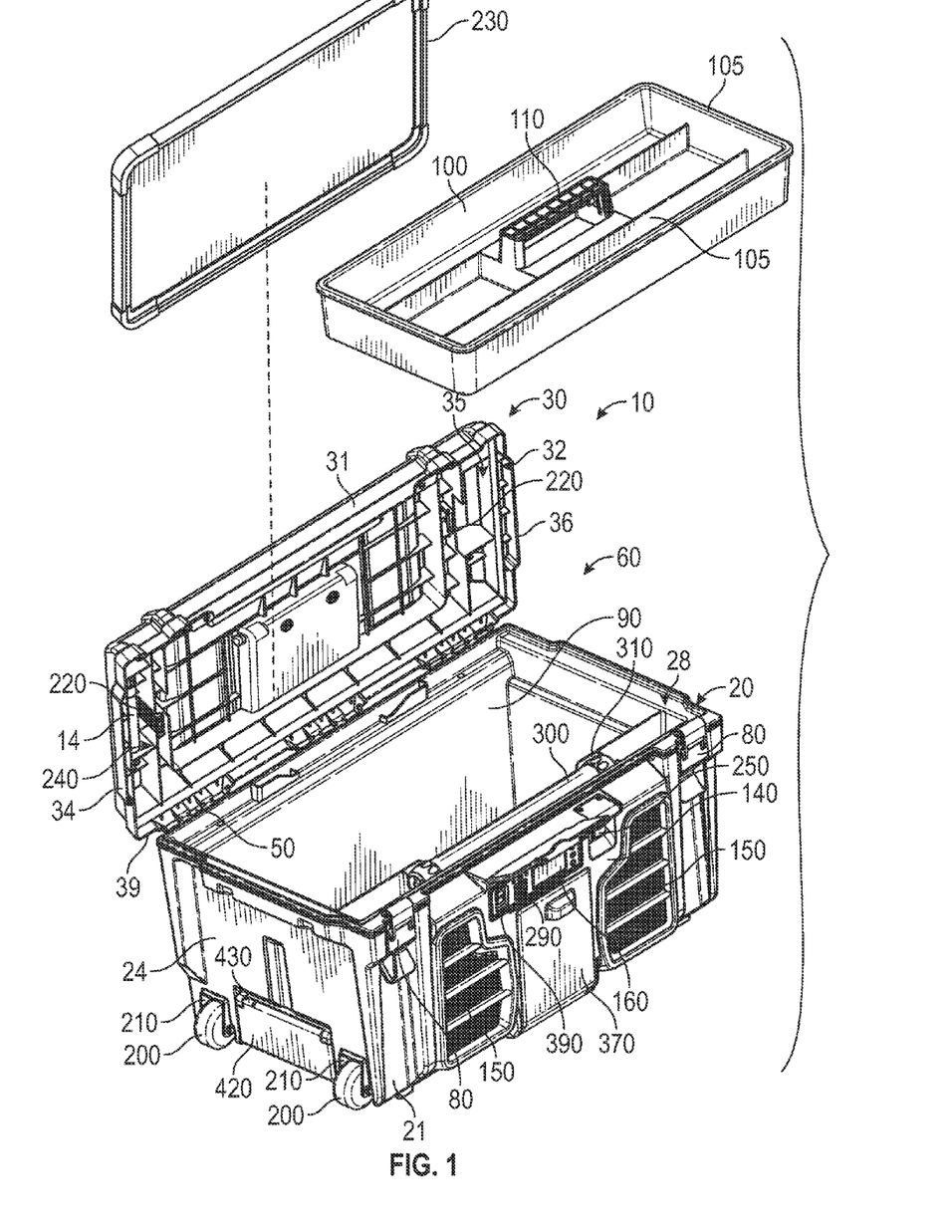
FIG. 1 is an exploded top perspective view, showing interior volumes of a case and cover of the invention, and a removable tray and message board.
Figure 2:
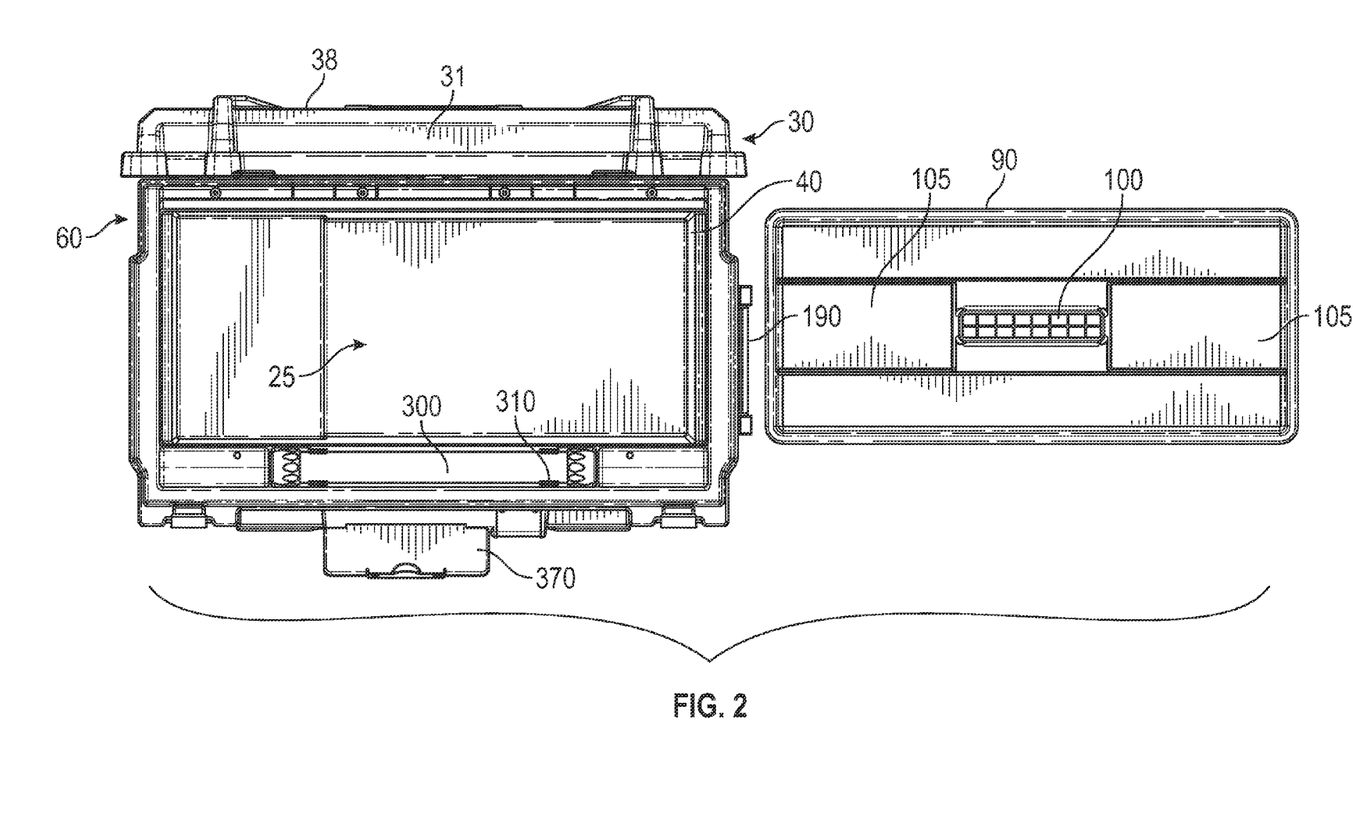
FIG. 2 is a top plan view of FIG. 1, the message board omitted for clarity of illustration.
Figure 3:
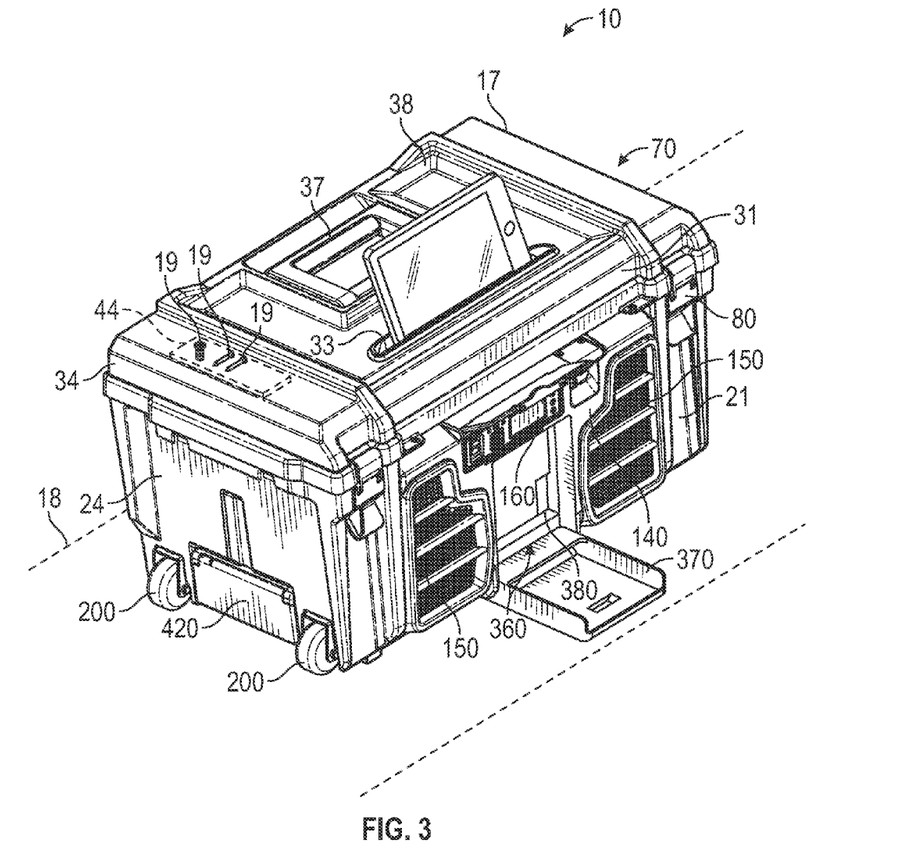
FIG. 3 is a perspective view of the invention shown with the cover in a closed position, and with an external storage volume cover in an open position.

FIGS. 1-3 illustrate a toolbox 10 that comprises a rigid case 20 that has a front side 21, a rear side 29, a left side 24, a right side 26, an open top side 28, and a bottom side 22. The open top side 28 provides access to an internal case storage volume 25 therein which includes at least one tray ledge 40 below the open top side 28 thereof. The case 20 is made with a rigid plastic material through an injection molding process, and may further include an inner lining layer (not shown) so that electrical conductors (not shown) may be routed between the case 20 and the inner lining.

A rigid cover 30 similarly has a front side 31, a rear side 39, a left side 34, a right side 36, a top side 38, and an open bottom side 32. The bottom side 32 is open to a cover storage volume 35. The rear side 39 is fixed proximate the bottom side 32 with the rear side 29 of the case 20 proximate the open top side 28 of the case at a plurality of hinges 50. The cover 30 is movable between an open position 60 that provides access to the case storage volume 25 and the cover storage volume 35, and a closed position 70 for closing the toolbox 10. Such a cover 30 is preferably injection molded with a rigid plastic material.

The top side 38 of the cover 30 may further include a portable electronic device support recess 33 adapted to hold a portable electronic device 17 upright therein when the toolbox 10 is resting on a horizontal surface 18 and when the cover 30 is in the closed position 70. At least one magnet 440 is preferably embedded in the case 20 and/or cover 30 for selectively retaining magnetically attractive objects 190, such as screws and nails, on the case 20 and/or cover. Preferably the magnet 440 is fixed between a top handle 37 of the cover 30 and the support recess 33.

At least one of the sides 24,25 of the case 20 may include a handle 190 (FIG. 2) and the other side 25,24 of the case 20 and/or the bottom side 22 may include two wheels 200 (FIG. 3). As such, the toolbox 10 may be rolled along a ground surface 18 by a user holding the handle 190 and tilting the toolbox 10 so that the toolbox 10 is supported on the ground surface 18 by the wheels 200. Two wheel wells 210 may be formed into the opposing side 25,24 of the case 20 and/or the bottom side 22 of the case 20, one of the wheels 200 being fixed within each wheel well 210. In one embodiment, each side 24,25 of the case 20 includes a handle 190 for carrying the toolbox 10 manually with two hands. Each handle 190 is preferably pivotally attached with the case 20.

A message board retaining mechanism 220, such as a pair of spring clips, is preferably fixed within the cover storage volume 35 of the cover 30 and adapted to selectively retain a removable message board 230 therein (FIG. 1). Such a removable message board 230 may be a white board, chalk board, or the like. The cover storage volume 35 further includes at least one marking implement holder 240 for selectively retaining a marking implement 14 for use on the message board 230. Such a marking implement holder 240 is preferably a U-shaped spring clip, or the like.

At least one two-part clasp mechanism 80 is fixed with the front sides 21,31 of the case 20 and cover 30 to selectively secure the cover 30 in the closed position 70. In one embodiment, the clasp mechanism 80 includes an aperture (not shown) through a padlock may be locked to lock the toolbox 10 in the closed position 70.

A removable tray 90 has at least one handle 100 and is adapted to rest on the at least one tray ledge 40 of the case 20 without contacting the cover 30 when the cover 30 is in the closed position 70. The tray 90 is preferably plastic injection molded and may be divided into a plurality of compartments 105.

Figure 4:
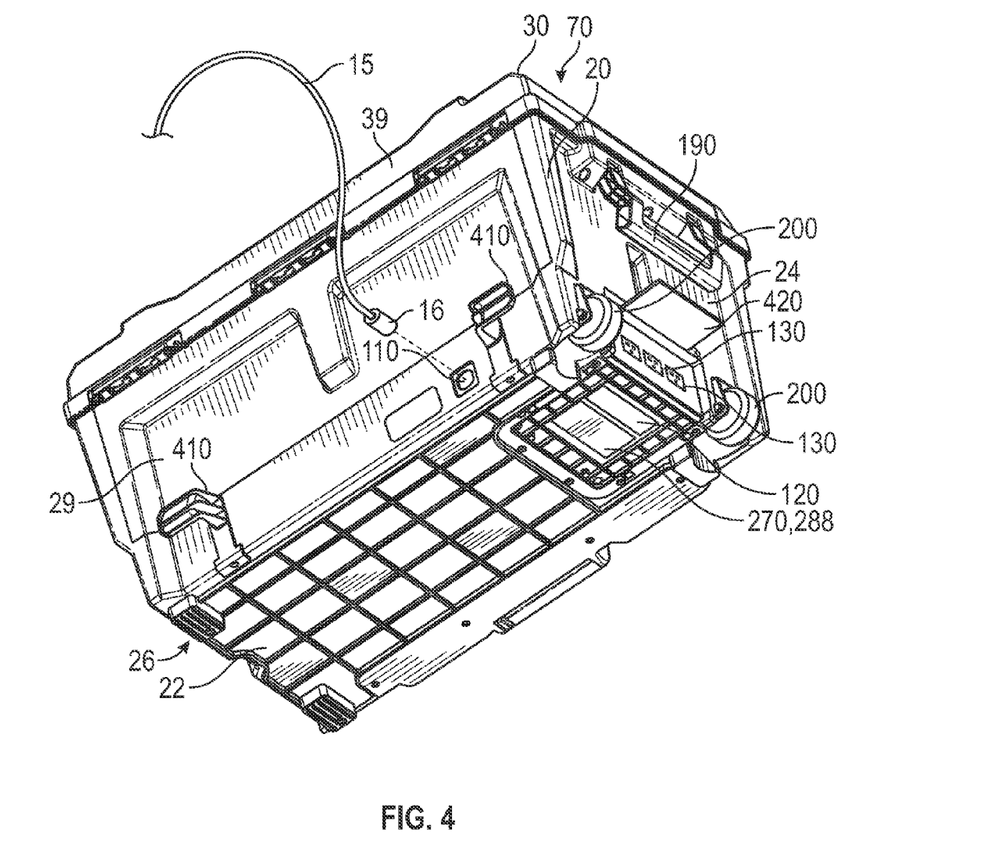
FIG. 4 is a bottom perspective view, showing an optionally removable power cord and a plurality of power receptacles.

A power cord receptacle 110 is fixed the case 20, preferably at the rear side 29 thereof (FIG. 4), and is adapted to receive therein a connector 16 of a power cord 15, which is either supplied with the toolbox 10 or purchased separately. The power cord 15 may also be fixed with the receptacle 110 and not removable in some embodiments. The rear side 29 of the case 20 preferably includes at least two winding posts 410 around which the power cord 15 is wound and secured for facilitating transport and storage of the toolbox 10. The power cord receptacle 110 conducts power to a power strip circuit 120 having a plurality of power receptacles 130. An electrical receptacle cover 420 that is urged by a biasing means 430, such as a spring, covers the plurality of electrical receptacles 130.

Figure 5:
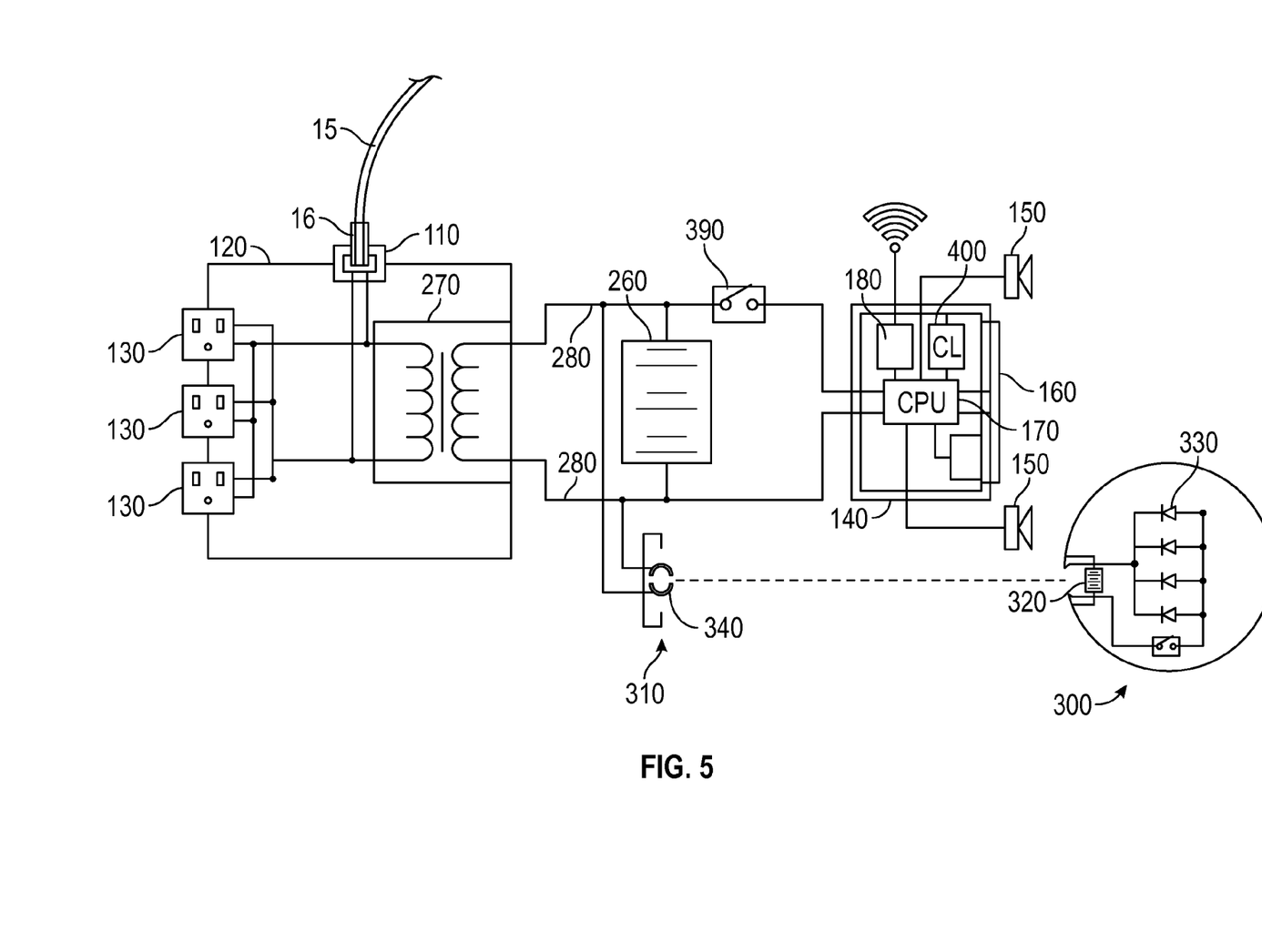
FIG. 5 is a schematic diagram of the invention.

An audio system 140 is fixed with the case 20 and includes a plurality of speakers 150, a display interface 160, and a control circuit 170 that receives power from the power strip circuit 120. The control circuit 170 includes a wireless audio signal receiver 180 (FIG. 5) and, optionally, a clock circuit 400 for displaying the current time on the display interface 160. The audio system 140 further preferably includes at least one battery 260 electrically connected through an optional on/off switch 390 with the control circuit 170, and a transforming means 270 such as a step-down transformer for providing a low-voltage power source 280 to recharge the at least one battery 260 of the audio system 140. The audio system 140 may further include a standard headset or headphone jack (not shown) for outputting an audio signal instead of through the plurality of speakers 150, and at least one USB slot 290 electrically connected with the control circuit 170 for supplying power to the at least one USB slot 290. The control circuit 140 may be further adapted to receive the audio signal through the at least one USB slot 290 from the portable electronic device 170 as opposed to via the wireless audio signal receiver 180. An optional bottle opener 250 may be fixed with either the case 20 or the audio system 140 (FIG. 1).

A lamp device 300 may be further included that is selectively removable from a lamp holder 310 of the case 20. The lamp device 300 includes a battery 320 (FIG. 5) and at least one lamp or LED 330. The lamp holder 310 holds the lamp device 300 such that the lamp device 300 is able to illuminate the case and cover storage volumes 25,35 when the cover 30 is in the open position 60. Preferably the lamp holder 310 includes power contacts 340 electrically connected to the battery 320 of the lamp device 300 is retained within the lamp holder 310. The power contacts 340 of the lamp holder 310 are electrically connected with either the power strip circuit 120 or the battery 260 of the audio system 140. As such the lamp holder 310 acts as a recharging docking station for the lamp device 300, which may be removed to illuminate a workspace or the like if desired.

An external storage volume 360 fixed within the audio system 140 is covered with a spring-biased external storage volume cover 370 (FIGS. 1 and 3). The external storage volume 360 may be used to store keys, wallets, cellular phones, or the like, and may further include a battery compartment 380 covered with a removable battery compartment door 385 for the battery 260 of the audio system 140.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A toolbox, comprising:
    a rigid case having a front, rear, left, right, top and bottom sides, the top side open to a case storage volume therein that includes at least one tray ledge below the open top side thereof;
    a rigid cover having front, rear, left, right, top and bottom sides, the bottom side open to a cover storage volume therein, the rear side fixed proximate the open bottom side with the rear side of the case proximate the open top side of the case at a plurality of hinges, the cover being moveable between an open position providing access to the case storage volume and the cover storage volume and a closed position for closing the case;
    at least one two-part clasp mechanism fixed with the front sides of the cover and case operates to selectively secure the cover in the closed position;
    a removable tray having at least one handle and adapted to rest on the at least one tray ledge of the case without contacting the cover when the cover is in the closed position;
    a power cord receptacle fixed through the case, adapted to receive therein a connector of a power cord, the power cord receptacle conducting power to a power strip circuit having a plurality of power receptacles fixed through the case;
    an audio system fixed with the case and including a plurality of speakers, a display interface, and a control circuit that receives power from the power strip circuit, the control circuit including a wireless audio signal receiver.

2. The toolbox of claim 1 wherein at least one of the sides of the case includes a handle and an opposing side of the case and/or the bottom side of the case includes two wheels, whereby the toolbox may be rolled along a ground surface by a user holding the handle and tilting the toolbox so that the toolbox is supported on the ground surface by the wheels.

3. The toolbox of claim 2 wherein two wheel wells are formed into the opposing side of the case and/or the bottom side of the case, one of the wheels being fixed within each wheel well.

4. The toolbox of claim 2 wherein the handle is pivotally fixed with the side of the case.

5. The toolbox of claim 1 further including a message board retaining mechanism fixed within the cover storage volume of the cover and adapted to selectively retain a removable message board therein, the cover storage volume further including at least one marking implement holder for selectively retaining a marking implement.

6. The toolbox of claim 5 wherein the top side of the cover includes a portable electronic device support recess adapted to hold a portable electronic device upright therein when the toolbox is resting on a horizontal surface.

7. The toolbox of claim 1 further including a bottle opener fixed with the case.

8. The toolbox of claim 1 further including a bottle opener fixed with the audio system.

9. The toolbox of claim 1 wherein the audio system further includes at least one battery electrically connected with the control circuit, and wherein the power strip circuit includes a transforming means for providing a low-voltage power source to recharge the at least one battery of the audio system.

10. The toolbox of claim 1 wherein the audio system further includes at least one USB slot electrically connected with the control circuit for supplying power to the at least one USB slot.

11. The toolbox of claim 10 wherein the control circuit is adapted to receive an audio signal through the at least one USB slot.

12. The toolbox of claim 1 further including a lamp device selectively removable from a lamp holder of the case, the lamp device including a battery and at least one lamp or LED, the lamp device able to illuminate the case and cover storage volumes when the cover is in the open position.

13. The toolbox of claim 12 wherein the lamp holder includes power contacts electrically connected to the battery of the lamp device when the lamp device is retained within the lamp holder, the power contacts of the lamp holder electrically connected with the power strip circuit.

14. The toolbox of claim 9 further including a lamp device selectively removable from a lamp holder of the case, the lamp device including a battery and at least one lamp or LED, the lamp device able to illuminate the case and cover storage volumes when the cover is in the open position, the lamp holder including power contacts electrically connected to the battery of the lamp device when the lamp device is retained within the lamp holder, the power contacts of the lamp holder electrically connected with the battery of the audio system.

15. The toolbox of claim 1 further including an external storage volume fixed within the audio system and covered with a spring-biased external storage volume cover.

16. The toolbox of claim 9 further including an external storage volume fixed within the audio system and covered with a spring-biased external storage volume cover, wherein the external storage volume includes a battery compartment for the battery of the audio system.

17. The toolbox of claim 1 wherein the control circuit of the audio system further includes an on/off switch for selectively activating and deactivating the audio system, the control circuit further including a clock circuit for displaying the current time on the display interface.

18. The toolbox of claim 1 wherein the rear side of the case further includes at least two winding posts around which the power cord may be wound and secured.

19. The toolbox of claim 1 further including an electrical receptacle cover that is urged by a biasing means to cover the plurality of electrical receptacles.

20. The toolbox of claim 1 further including at least one magnet embedded in the case and/or cover for selectively retaining magnetically attractive objects on the case and/or cover.

* * * * *